US007559270B2

(12) United States Patent

Langenfeld et al.

(10) Patent No.: US 7,559,270 B2
(45) Date of Patent: Jul. 14, 2009

(54) HYDRAULIC CYLINDER SYSTEM

(75) Inventors: Joesph W. Langenfeld, Onawa, IA (US); Neal W Westendorf, Dakota Dunes, SD (US)

(73) Assignee: Westendorf Manufacturing Co., Inc., Onawa, IA (US)

( * ) Notice: Subject to any disclaimer, the term of this patent is extended or adjusted under 35 U.S.C. 154(b) by 241 days.

(21) Appl. No.: 11/603,716

(22) Filed: Nov. 22, 2006

(65) Prior Publication Data

US 2008/0115490 A1 May 22, 2008

(51) Int. Cl.
*F15B 11/00* (2006.01)
*B60D 1/01* (2006.01)

(52) U.S. Cl. .......................................... 91/526; 91/527

(58) Field of Classification Search ................... 91/525, 91/526, 527
See application file for complete search history.

(56) References Cited

U.S. PATENT DOCUMENTS 2,363,179 A 11/1944 Harrington
2,850,879 A 9/1958 Schnabel
2,892,311 A 6/1959 Gerpen
3,875,747 A 4/1975 Briggs
3,992,882 A 11/1976 Bodin
4,002,220 A 1/1977 Wible
4,617,854 A 10/1986 Kropp
4,635,440 A 1/1987 Kropp
5,147,173 A * 9/1992 Fauber et al. ............... 403/325
5,285,641 A 2/1994 Goto
5,467,542 A * 11/1995 Hulden ........................ 37/468
5,890,871 A 4/1999 Woerman
6,260,357 B1 * 7/2001 Goodfellow et al. .......... 60/470
6,266,960 B1 * 7/2001 Bibb et al. .................... 60/486
6,283,488 B1 * 9/2001 Adamek et al. ............... 91/526
6,418,717 B1 7/2002 Christiaens
6,502,393 B1 1/2003 Stephenson
6,618,659 B1 9/2003 Berger
6,773,223 B2 8/2004 Harris

* cited by examiner

*Primary Examiner*—Thomas E Lazo
(74) *Attorney, Agent, or Firm*—Dowell Baker, P.C.

(57) ABSTRACT

A hydraulic system that allows pressurized fluid to be stolen from a master or lift cylinder and directed to a single acting cylinder to perform a function. The system utilizes a spring in the single acting cylinder to force the fluid to retract through the same single line that powered the single acting cylinder. The fluid is then routed to the unloaded side of the master cylinder. This system provides many cost efficiencies and may be utilized by work vehicles to perform secondary functions such as attaching and removing an implement and locking and unlocking a loader.

54 Claims, 5 Drawing Sheets

HYDRAULIC CYLINDER SYSTEM

FIELD OF THE INVENTION

The present invention relates generally to hydraulic cylinders, and more specifically to an apparatus for integration with a tractor, skid steer, or vehicle wherein pressurized fluid is taken from a master cylinder to activate a small single acting cylinder for the performance of a secondary function.

BACKGROUND OF THE INVENTION

Work vehicles such as tractors, skid steers, four wheelers and bulldozers are often equipped with many types of attachments. Loaders are often attached to the front of such equipment with arms and hydraulic controls that allow the loader to be raised and lowered, and also rolled forward and backward. Many different implements can be attached to the front of these work vehicles allowing the operator to accomplish various tasks via a single work vehicle.

Conventional front-end loaders have a pair of lifting arms or boom assemblies that have rearward ends that pivotally attach to a tractor, and forward ends that pivotally attach to an implement. A coupler is often used to connect various implements to the lifting arms. This allows the owner of a work vehicle to change the implement attached to the work vehicle in order to address the needs of a particular job. Exemplary implements found on conventional front-end loaders include buckets, clam shells, plows, fork lifts, bale spears, etc.

Generally the arms of the loader and the attached implement are controlled by a hydraulic system. Hydraulic cylinders are provided for operating front-end loaders and their attached implements. Hydraulic lines can be found extending along the exterior (or routed along the interior) of the front-end loaders for powering the hydraulic cylinders. In addition, when attaching front-end loaders to a tractor, it is often necessary to separately and manually connect the hydraulic lines on the front-end loader to the hydraulic lines on the tractor.

The current hydraulic systems used to attach the various implements to loaders suffer from a number of drawbacks. Typically, a third function hydraulic or electric valve is required to power hydraulic couplers. Additionally, multiple hydraulic lines, components and couplings are required to perform additional functions, thereby increasing costs. Furthermore, these additional hydraulic lines must be coupled each time a loader is attached to the work vehicle.

A drawback of hydraulic systems that use diverter valves is that only a single function may be completed at a time. An improved system that allows multiple cylinders to be used and activated simultaneously is needed.

Yet another drawback of the current hydraulic systems is that the vehicle must be powered on so that the pump can provide pressurized fluid to perform a secondary function. It is desirable to be able to perform a secondary function without necessarily turning the vehicle on and going to the pump.

A primary object of the present invention is to overcome one or more of the disadvantages of the prior art hydraulic systems for work vehicles. The present invention allows secondary functions or operations to be completed while the primary use of the loader is uninterrupted. This provides the benefit of a more responsive system, since there is no time lapse while one system is waiting on the other.

Another feature of the present invention is that it provides economic savings by reducing the number of hydraulic lines, components and couplings required. The present invention also eliminates the need for a third function hydraulic or electric valve.

Yet another feature of the present invention is that it does not require an additional set of two hydraulic lines to be coupled each time a quick-mount loader is attached. Furthermore, this results in a more cost efficient system because additional lines back to the pump are no longer required.

An additional feature of the present invention is that the single acting cylinder can be activated without going to the pump or turning the tractor on, as long as the loader is off the ground or the lift cylinder is under pressure. Here the power comes from the weight of the loader and the things attached to it.

SUMMARY OF THE INVENTION

The preferred embodiment of the present invention provides an improved hydraulic cylinder system that utilizes a master cylinder under pressure to power a single acting cylinder to perform a function. Fluid is taken from the master cylinder by a single acting cylinder so that both cylinders can perform tasks simultaneously. Once the secondary function is complete and the single acting cylinder is no longer receiving pressurized fluid, the single acting cylinder is forced to retract causing the fluid to flow back through the hydraulic conduit and into the backside of the master cylinder.

The second preferred embodiment of the present invention provides an improved hydraulic cylinder system that utilizes a master or lift cylinder under pressure to power a single acting cylinder to perform a function. Fluid is taken from the master cylinder and directed to a single acting cylinder. Once the secondary function is complete and the single acting cylinder is no longer receiving pressurized fluid, a spring causes the single acting cylinder to retract forcing the fluid to flow back through the hydraulic conduit and into the backside of the master cylinder.

In the third preferred embodiment, the present invention is modified for use on a tractor, skid steer or vehicle. For example, the single acting cylinder steals pressurized fluid from a lift cylinder to perform a secondary function such as connecting or disconnecting an implement to a front-end loader, or locking or unlocking a frond-end loader to the vehicle.

A fourth preferred embodiment incorporates a switching block and solenoid valve wherein the switching block and the solenoid valve direct a portion of the pressurized fluid away from the lift cylinder to power the single acting cylinder.

A fifth preferred embodiment incorporates a check valve. The check valve is connected to the lift cylinder. The check valve only allows fluid to flow into the non-pressurized side of the lift cylinder. Further, the check valve only allows the fluid to return to the lift cylinder when that cylinder side is not pressurized, sometimes causing the oil to remain inside the single acting cylinder.

A sixth preferred embodiment modifies the current system so that when the lift cylinder is under pressure, the single acting cylinder will work without going to the pump or turning on the tractor.

The preferred embodiments offer cost efficiencies, less and smaller hydraulic lines and additional functionality in a hydraulic system. This and other advantages will become apparent as this specification is read in conjunction with the accompanying drawings and appended claims.

DETAILED DESCRIPTION

The present invention may be used with any vehicle having at least one master, lift or implement cylinder and at least one, small single acting cylinder. Although the preferred embodiment of the present invention is intended and adapted for use with a tractor or skid steer, those of skill in the art will recognize that the present invention is equally adaptable for use with other utility vehicles and for use in other applications using multiple cylinders to perform multiple functions. However, for descriptive purposes, the present invention will be described for use on a tractor or skid steer.

Figure 1:
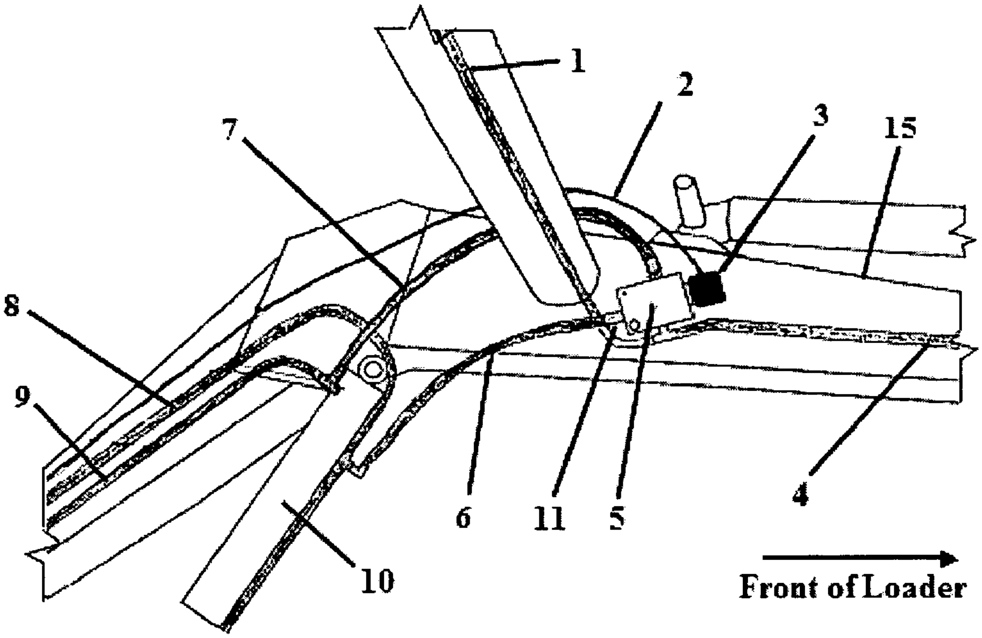
FIG. 1 is a side view of the improved hydraulic system displaying a lift cylinder connected to the switching block.

FIG. 1 shows the conduits of the present hydraulic system connecting the lift cylinder 10 to the switching block 5. The major components shown in FIG. 1 include a lift cylinder 10, a switching block 5, a solenoid 3, a lifting arm 15, an electrical line 2, hydraulic conduits 1 and 4 connecting to a single acting cylinder 21 (shown in FIG. 4), conduits 8 and 9 connecting to a hydraulic pump (not shown) and conduits 6 and 7 connecting the switching block 5 and the lift cylinder 10.

Figure 2:
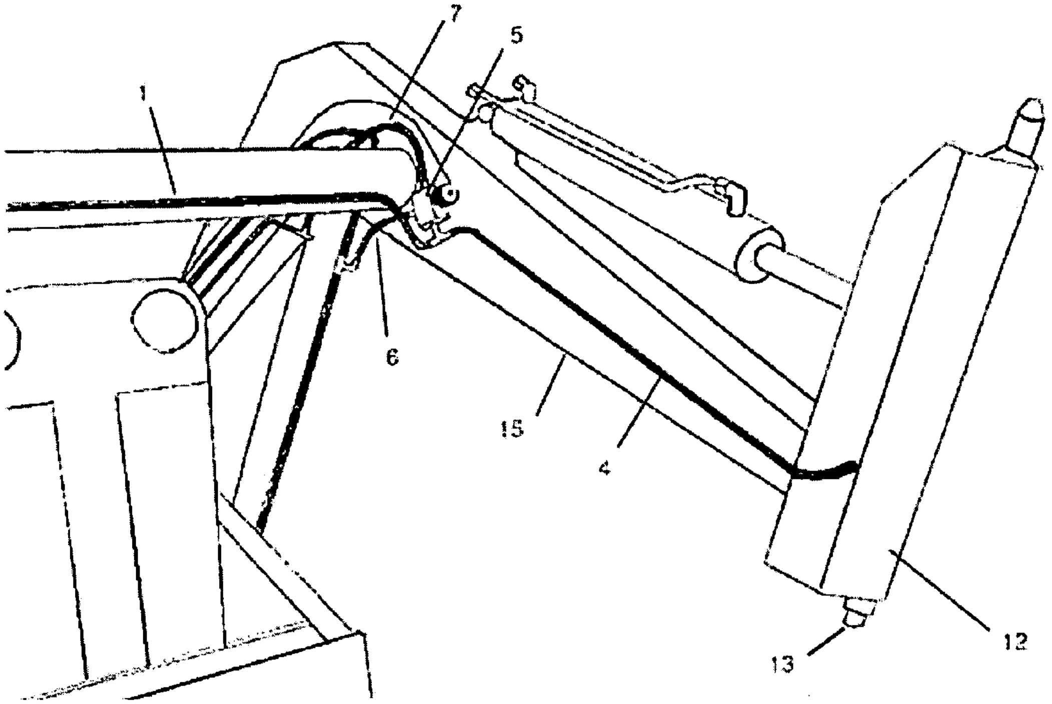
FIG. 2 is a perspective view showing the switching block connected to a coupler at the distal end of the lifting arms of a tractor.

FIG. 2 shows the hydraulic system of the present invention connected to moveable lifting arms 15 of a tractor. The major components shown in FIG. 2 include the hydraulic conduits 1, 4, 6 and 7, coupler 12 and peg 13.

Figure 3:
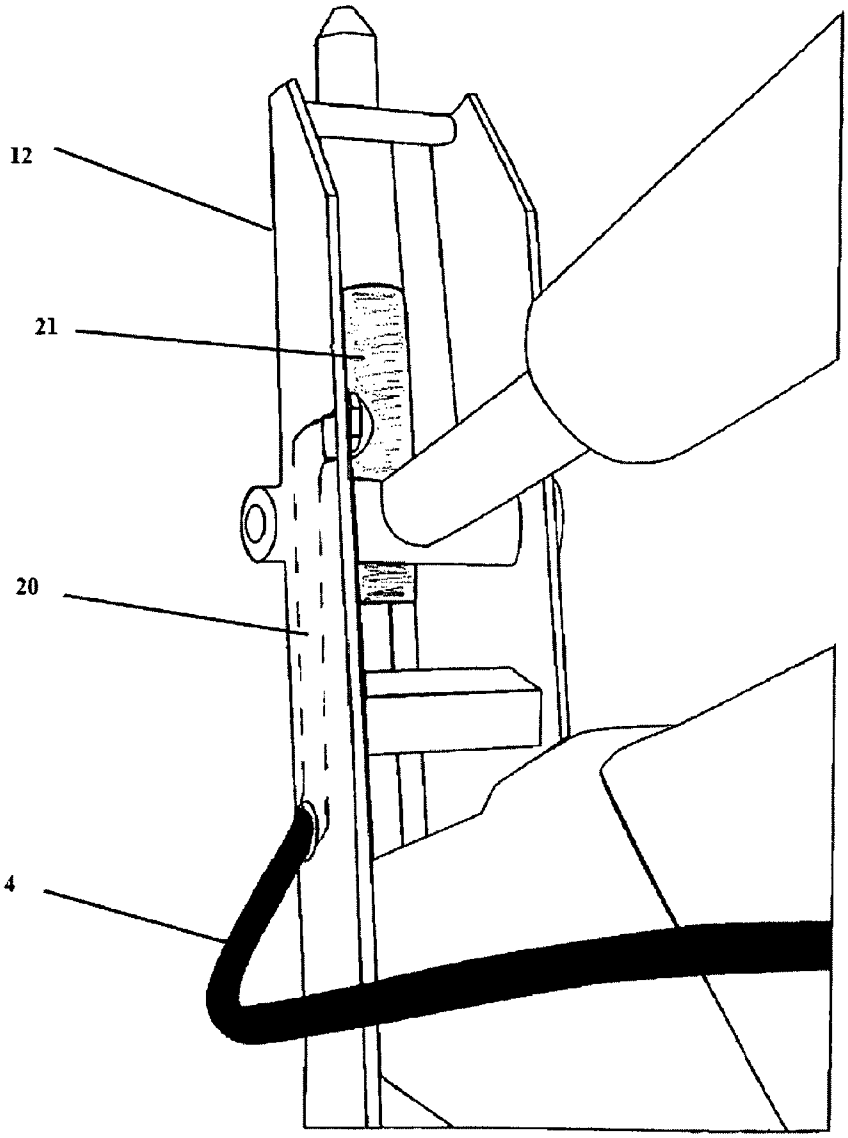
FIG. 3 is a view of a coupler, including the single acting cylinder.

FIG. 3 shows a view of coupler 12 with the single acting hydraulic cylinder 21. The major components of FIG. 3 include hydraulic conduit 4, tube 20 and the single acting cylinder 21.

Figure 4:
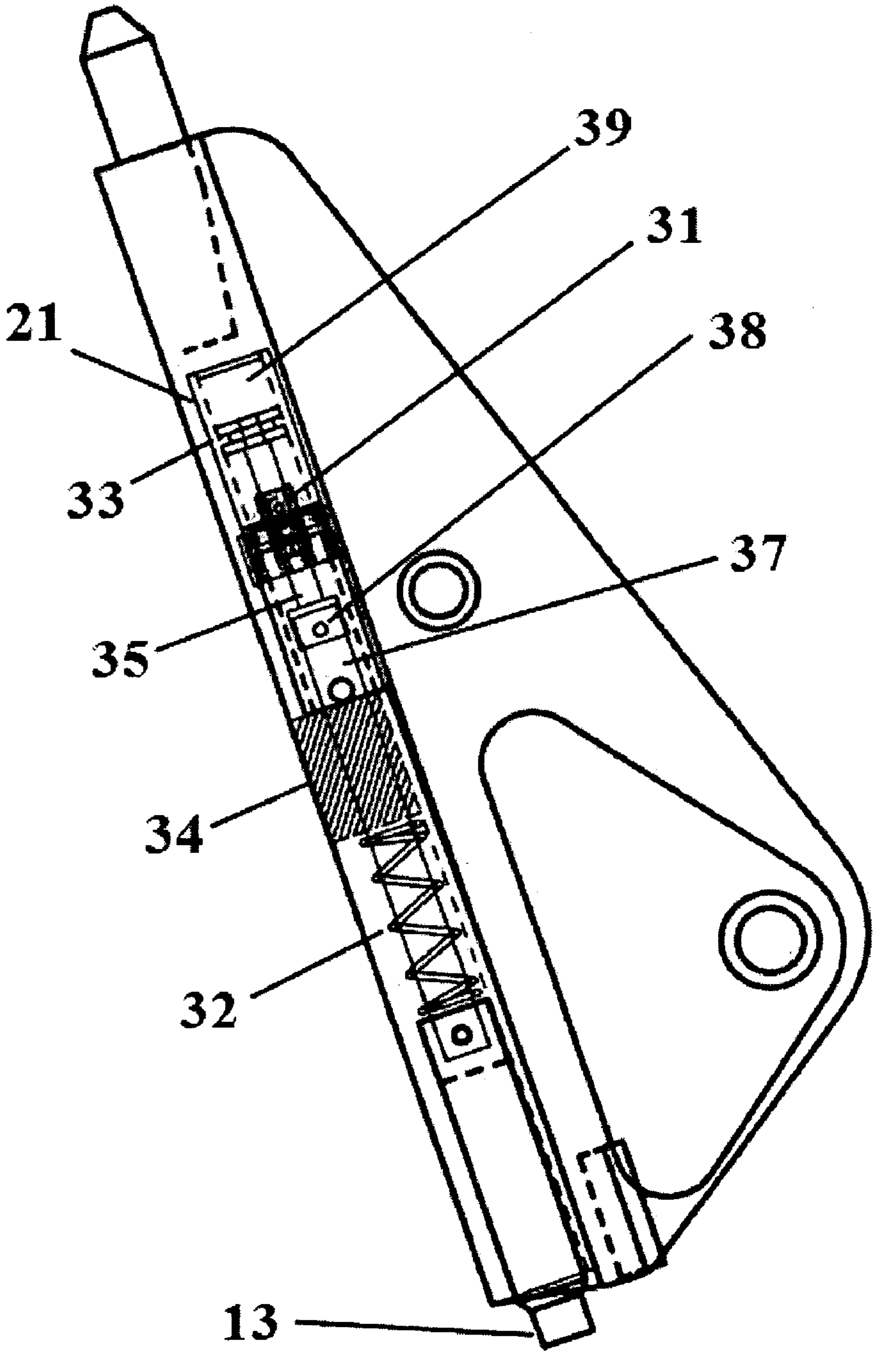
FIG. 4 is a view of a single acting cylinder.

FIG. 4 shows a single acting cylinder 21. The major components of FIG. 4 include a port 31, a piston 33, a piston rod 35, a stationary block 34, a spring 32, a bar 37, an air-port 38, an air space 39 and a peg 13.

Figure 5:
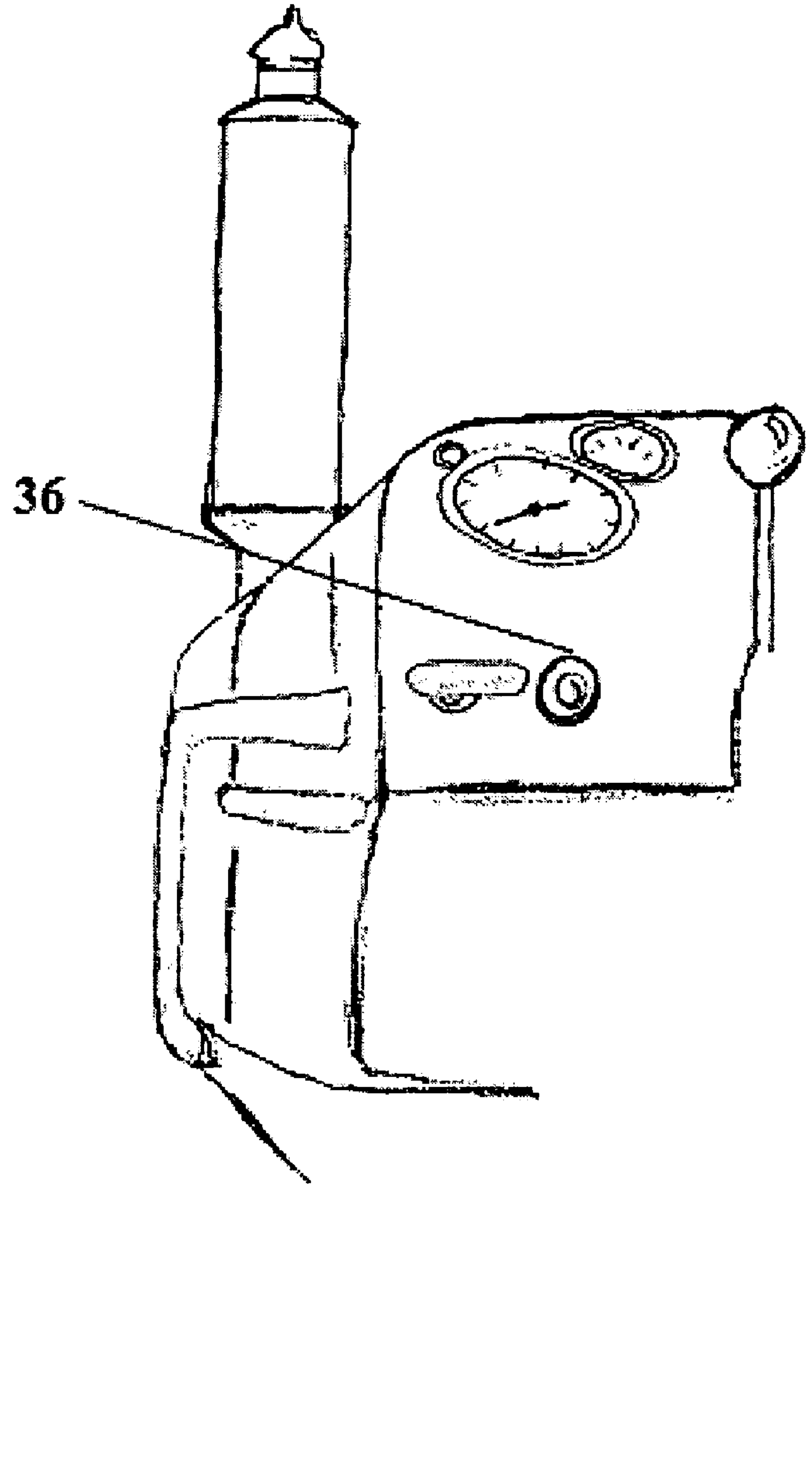
FIG. 5 is a view of the dashboard of a tractor with a switch to activate the solenoid of the switching block.

FIG. 5 shows a perspective view of the dashboard of a tractor, including switch 36.

As shown in FIG. 1, hydraulic conduit 6 connects the lift cylinder 10 to the switching block 5. It should be understood that the name "lift cylinder" is used because of the placement of the cylinder on the loader assembly and its function to raise and lower the loader assembly. However, the lift cylinder 10 can be used for different applications. The name "lift cylinder" is used as a matter of convenience and does not limit how the cylinder is used. It should also be understood that the lift cylinder 10 may be referred to as a "master cylinder" because it describes the cylinder that is providing the pressurized fluid to the single acting cylinder 21.

It should be understood that the name "single acting cylinder" is used because the pressurized fluid is provided to one side of the cylinder. Typically when the fluid pressure is cut-off, the single acting cylinder will hold its normal position. The cylinder can be returned to the retracted position by an opposing force, such as a spring or an external load.

Hydraulic conduit 9 carries pressurized fluid to the lift cylinder 10. Line 2 is an electrical line, which connects the solenoid 3 to the dashboard of the tractor. A switch 36 (FIG. 5) on the dashboard allows the solenoid 3 to be activated from the seat of the tractor. When the solenoid 3 is activated, the switching block 5 allows the conduit 6 to steal pressurized fluid from the lift cylinder 10. The switching block 5 directs pressurized fluid through the conduits 1 and 4 to their respective single acting cylinders 21 located at the end of each lifting arm 15 of the tractor. Since the single acting cylinder 21 is relatively small compared to the lift cylinder 10, both the lift cylinder 10 and the single acting cylinder 21 can operate at the same time. The minor volume of fluid stolen from the lift cylinder 10 has no adverse effects on the operation of the lift cylinder.

When the single acting cylinder 21 is no longer receiving pressurized fluid, a spring 32 forces the single acting cylinder 21 to re-track, reversing the flow of the once pressurized fluid. The fluid re-tracks back through the same hydraulic conduits 1 and/or 4 to the switching block 5, where the fluid is routed through the conduit 7 to check valve 11. At check valve 11 the fluid is only allowed to flow into (and not out of) the backside of the non-pressurized side of the lift cylinder 10. Finally, conduit 8 returns oil to the reservoir and pump (not shown).

FIG. 2 shows the hydraulic system connected to the moveable lifting arms 15 of a tractor. Conduit 1 crosses the front of the tractor to the corresponding lifting arm on the other side (not shown). Conduit 4 connects to and provides pressurized fluid to the single acting cylinder 21 (see FIG. 4) located inside the coupler 12. Peg 13 allows the coupler 12 to connect to an implement (not shown).

FIG. 3 shows a coupler 12 with the single acting hydraulic cylinder 21. The single acting cylinder 21 receives pressurized oil through conduit 4. Tube 20 conceals the conduit 4 as it connects to the single acting hydraulic cylinder 21.

FIG. 4 shows the single acting cylinder 21 wherein pressurized fluid is received via conduit 1 or 4 (not shown) through port 31. The pressurized fluid causes the piston 33 to move into the air space 39. The piston 33 is connected to the piston rod 35, which is connected to a bar 37 which extends through the stationary block 34, and connects to peg 13. As the piston 33 receives pressurized fluid, the piston 33 extends, forcing the air in the air space 39 through a hole (not shown) through the center of the piston rod 35 where it escapes through the air-port 38. The movement of piston 33 forces the peg 13 to retract (although those with skill in the art will recognize that the orientation of the cylinder 21 and the arrangement of the spring 32 can be modified so that the peg 13 extends). When the pressurized fluid is cut off, the spring 32 expands from stationary block 34, forcing the piston 33 to retract and moving the corresponding peg 13 back to its original position. The ability to extend and retract the peg 13 of the coupler 12 allows the coupler 12 to attach and detach various implements (not shown) to the lifting arms 15 of the tractor.

FIG. 5 shows a perspective view of the dashboard of a tractor. Switch 36 allows the switching block 5 to be operated from the seat of the tractor. Once the switch 36 is activated, the single acting cylinder 21 will cause the peg 13 to retract. Once the switch 36 is no longer activated the spring 32 causes the peg 13 to return to its original position. This arrangement provides an added safety feature as the peg 13 will only remain retracted so long as the switch 36 is activated. Therefore, any accidental loss of hydraulic pressure will not cause an implement to detach.

The switch 36 also allows the operator to perform various functions, such as connecting and disconnecting implements to the lifting arms of the tractor without leaving the seat. The switch and hydraulic system of the present invention can also be used to lock and unlock a quick mount loader to and from the tractor.

Other alterations, variations, and combinations are possible that fall within the scope of the present invention. Although the preferred embodiment of the present invention has been described, those skilled in the art will recognize other modifications that can be made that would nonetheless fall within the scope of the present invention. Therefore, the present invention should not be limited to the apparatus and method described. Instead, the scope of the present invention should be consistent with the invention claimed below.

What is claimed is:

1. A hydraulic system having a hydraulic pump and a hydraulic fluid reservoir connected to hydraulic conduits, wherein the hydraulic pump is connected to pump hydraulic fluid from the reservoir through the hydraulic conduits, wherein the hydraulic system further comprises:

a master cylinder connected to the conduits of the hydraulic system so as to be powered by the hydraulic pump;

a switching block;

a single acting cylinder substantially mobile relative to the master cylinder and hydraulically connected to the master cylinder via the switching block;

wherein pressurized fluid is provided to the master cylinder;

wherein some of the pressurized fluid is directed to the single acting cylinder.

2. The hydraulic system of claim 1 further comprising:

a single hydraulic line connecting the switching block to the single acting cylinder;

wherein the single acting cylinder is constructed to force the pressurized fluid to retract through the single hydraulic line when the pressurized fluid is no longer pressurized.

3. The hydraulic system of claim 2, wherein the single acting cylinder further includes:

a spring;

wherein the spring causes the pressurized fluid to retract through the single hydraulic line when the pressurized fluid is no longer pressurized.

4. The hydraulic system of claim 3, in which the switching block has a solenoid.

5. The hydraulic system of claim 4, wherein the switching block is connected to an electrical system.

6. The hydraulic system of claim 2 further comprising:

a check valve connected to the master cylinder, the check valve allowing the previously pressurized fluid to drain into the non-pressurized side of the master cylinder.

7. The hydraulic system of claim 1 wherein some of the pressurized fluid is stolen by the single acting cylinder so that the master cylinder and the single acting cylinder can perform functions simultaneously.

8. The hydraulic system of claim 1 wherein the master cylinder extension and retraction is substantially unaffected by the diversion of the hydraulic fluid to and from the single acting cylinder.

9. A tractor, skid steer or vehicle comprising at least one implement lifting arm connectable to an implement and a hydraulic system capable of powering the implement lifting arm, the hydraulic system including a hydraulic pump and a hydraulic fluid reservoir connected to hydraulic conduits, wherein the hydraulic pump is connected to pump hydraulic fluid from the reservoir through the hydraulic conduits, wherein the hydraulic system further comprises:

a hydraulic lift cylinder connected to the conduits of the hydraulic system so as to be powered by the hydraulic pump, and secured to the lifting arm wherein extension of the hydraulic lift cylinder actuates the lifting arm;

a switching block;

a single acting cylinder connected to the lift cylinder via the switching block;

wherein pressurized fluid is provided to the lift cylinder;

wherein some of the pressurized fluid is directed to the single acting cylinder.

10. The hydraulic system of claim 9, further comprising:

a single hydraulic line connecting the switching block to the single acting cylinder;

wherein when the pressurized fluid directed to the single acting cylinder is no longer pressurized, the single acting cylinder is constructed to force the previously pressurized fluid to retract through the single hydraulic line.

11. The hydraulic system of claim 10, wherein the single acting cylinder further includes:

a spring;

wherein the spring causes the pressurized fluid to retract through the single hydraulic line when the pressurized fluid is no longer pressurized.

12. The hydraulic system of, claim 11 in which the switching block includes a solenoid.

13. The hydraulic system of claim 12, wherein the switching block is connected to an electrical system.

14. The hydraulic system of claim 10 further comprising:

a check valve connected to the lift cylinder, the check valve allowing the previously pressurized fluid to drain into the non-pressurized side of the lift cylinder.

15. The hydraulic system of claim 14 further comprising, a switching block having a solenoid;

wherein an electrical system for the vehicle is connected to the solenoid;

wherein the single acting cylinder is used to perform a secondary function.

16. The hydraulic system of claim 14 further comprising, a switching block having a solenoid;

wherein an electrical system for the vehicle is connected to the solenoid;

wherein the single acting cylinder is used to attach or remove an implement to or from the at least one implement lifting arm.

17. The hydraulic system of claim 14 further comprising, a switching block having a solenoid;

wherein an electrical system for the vehicle is connected to the solenoid;

wherein the single acting cylinder is used to lock or unlock a loader to or from the tractor, skid steer or vehicle.

18. The hydraulic system of claim 9 further comprising:

the single acting cylinder secured to the lifting arm, wherein actuation of the hydraulic lift cylinder elevates the entire single acting cylinder relative to the hydraulic lift cylinder.

19. The hydraulic system of claim 9 wherein the hydraulic lift cylinder is substantially separated from the single acting cylinder.

20. The hydraulic system of claim 9 wherein some of the pressurized fluid is stolen by the single acting cylinder during both extension and retraction of the hydraulic lift cylinder so that the hydraulic lift cylinder and the single acting cylinder can perform functions simultaneously.

21. A tractor, skid steer or vehicle comprising at least one implement lifting arm connectable to an implement and a hydraulic system capable of powering the implement lifting arm, the hydraulic system including a hydraulic pump and a hydraulic fluid reservoir connected to hydraulic conduits, wherein the hydraulic pump is connected to pump hydraulic fluid from the reservoir through the hydraulic conduits, wherein the hydraulic system farther comprises:

a hydraulic lift cylinder connected to the conduits of the hydraulic system so as to be powered by the hydraulic pump;

a switching block;

a single acting cylinder, substantially mobile relative to the lift cylinder and connected to the lift cylinder via the switching block;

wherein pressurized fluid is provided to the lift cylinder;

wherein some of the pressurized fluid is stolen by the single acting cylinder so that the lift cylinder and the single acting cylinder can perform functions simultaneously.

22. The hydraulic system of claim 21 wherein the at least one implement lifting arm is raised so that the implement is not in contact with the ground, wherein the single acting cylinder is provided pressurized fluid, powered by the weight of the implement and things attached to the implement.

23. The hydraulic system of claim 22, wherein the single acting cylinder is used to perform a secondary function.

24. The hydraulic system of claim 22, wherein the single acting cylinder is used to attach or remove an implement to or from the at least one implement lifting arm.

25. The hydraulic system of claim 22, wherein the single acting cylinder is used to lock or unlock a loader to or from the tractor, skid steer or vehicle.

26. A method for operating a loader having a lifting arm connecting to both a master hydraulic cylinder and a single acting hydraulic cylinder, the method comprising:

transferring a hydraulic fluid, with a hydraulic pump, from a hydraulic fluid reservoir to pressurize a first side of the master cylinder to extend a piston rod from the master cylinder and raise the lifting arm connected to the piston rod;

deactivating the hydraulic pump and isolating the reservoir from the master cylinder to cease the transfer of hydraulic fluid between the hydraulic fluid reservoir and the master cylinder; and slightly lowering the lifting arm to retract the piston rod into the master cylinder to pressurize the single acting cylinder by forcing the hydraulic fluid from the first side of the master cylinder into the single acting cylinder, wherein the hydraulic fluid within the single acting cylinder acts to force a second piston against a spring.

27. The method of claim 26 wherein the master cylinder is substantially separated from the single acting cylinder.

28. The method of claim 26 further comprising the step of:

depressurizing the single acting cylinder by draining the hydraulic fluid in the single acting cylinder via a switching block to the hydraulic reservoir.

29. The method of claim 26 wherein extending the piston rod substantially rotates the single acting cylinder relative to the master cylinder.

30. The method of claim 26 wherein the transferring step includes diverting a portion of the hydraulic fluid from the master cylinder to the single acting cylinder so that the master cylinder and the single acting cylinder can perform functions simultaneously.

31. A system for operating a single acting cylinder with hydraulic fluid diverted from a master cylinder operable in both an extended state and a retracted state, the system comprising:

a master cylinder including a first and second chamber respectively provided with hydraulic fluid from a reservoir via a first and second master conduit;

a first and second diverter conduit respectively diverting, from the first and second master conduit, a portion of the hydraulic fluid to a switching block; and the switching block selectively pressurizing the single acting cylinder by transmitting hydraulic fluid to the single acting cylinder from the master cylinder via the first diverter conduit when the master cylinder is in the extended state and via the second diverter conduit when the master cylinder is in the retracted state.

32. The system of claim 31 further comprising the switching block selectively de-pressurizing the single acting cylinder by transmitting hydraulic fluid from the single acting cylinder to the reservoir via the first diverter conduit and the first master conduit during the master cylinder retracted state, and the second diverter conduit and the second master conduit during the master cylinder extended state.

33. The hydraulic system of claim 32 wherein the single acting cylinder includes a spring pressuring the hydraulic fluid to retract back to the switching block.

34. The system of claim 33 further comprising only one hydraulic fluid transmission line connecting between the single acting cylinder and the switching block.

35. The system of claim 31 wherein the master cylinder is attached to a loader arm, the master cylinder elevates the loader arm during a transition from the retracted state to the extended state, and the single acting cylinder is distant from the master cylinder.

36. The system of claim 31 wherein the master cylinder is in the extended state and the system is fluidly isolated from a hydraulic fluid pump and reservoir; the system further comprising:

an elevated implement weight pressurizing the hydraulic fluid in the first chamber;

the switching block selectively transmitting the hydraulic fluid from the first chamber to actuate the single acting cylinder via the first master conduit, the first diverter conduit, and a transmission line extending between the switching block and the single acting cylinder.

37. The system of claim 36 wherein the volume of the first chamber is substantially larger than the hydraulic fluid capacity of the single acting cylinder such that the elevated weight is substantially stationary during the transmission of the hydraulic fluid from the first chamber to the single acting cylinder.

38. The system of claim 31 further comprising a fluid pump that when active, pumping the hydraulic fluid from the reservoir to the master cylinder, and when inactive, blocking the transmission of hydraulic fluid between the reservoir and the master cylinder;

the weight of an elevated implement exerting a downward force upon the master cylinder pressurizing the hydraulic fluid in the first chamber; and the switching block selectively operating the single acting cylinder while the fluid pump is inactive by transmitting the hydraulic fluid from the first chamber to the single acting cylinder via the first master conduit, the first diverter conduit, and a transmission line extending between the switching block and the single acting cylinder.

39. The system of claim 38 wherein the elevated implement is substantially stationary during the transmission of hydraulic fluid from the first chamber to the single acting cylinder.

40. The system of claim 31 wherein the master cylinder extension and retraction is substantially unaffected by the diversion of the hydraulic fluid to the single acting cylinder.

41. The system of claim 31 further comprising the hydraulic fluid in the first diverter conduit draining into the reservoir via the first master conduit during the master cylinder retracted state; and the hydraulic fluid in the second diverter conduit draining into the reservoir via the second diverter conduit during the master cylinder extended state.

42. The system of claim 31 wherein the single acting cylinder is one of a plurality of single acting cylinders receiving hydraulic fluid from the master cylinder via the switching block.

43. The system of claim 42 wherein at least one of a plurality of single acting cylinders is located on a first loader arm, and at least one of a plurality of single acting cylinders is located on a second loader arm distant from the first loader arm.

44. A method for diverting hydraulic fluid from a primary actuator to supply pressurized hydraulic fluid to a single acting actuator, the primary actuator attached to and operable to raise and lower a loader arm of a vehicle, the single acting actuator distant from the primary actuator and also connected to the loader arm, the method comprising:

pressurizing a first side of the primary actuator with hydraulic fluid transmitted via a first conduit to extend a primary piston rod, connected to the loader arm, from the primary actuator;

elevating the loader arm in response to a force exerted upon the loader arm by the piston rod, the loader arm exerting a load pressure upon the hydraulic fluid in the first side of the primary actuator;

restricting the flow of hydraulic fluid in the first hydraulic conduit to maintain the loader arm in an elevated position;

extending the single acting actuator by diverting the hydraulic fluid from the first conduit to the single acting actuator via a first diverter conduit and a switching block, wherein the switching block is in a first state to allow flow between the first diverter conduit and the single acting actuator, the elevation of the loader arm is substantially unaffected by the diversion of the hydraulic fluid, and the extending step is concurrent with the restricting step; and transferring hydraulic fluid from the single acting actuator to a second side of the primary actuator via a second diverter conduit, a second conduit connecting to the primary actuator and the switching block in a second state to allow hydraulic flow between the single acting actuator and the second diverter conduit, wherein the transfer of fluid from the single acting actuator unextends the single acting actuator.

45. The method of claim 44 wherein the single acting actuator further includes:

a spring pressuring the hydraulic fluid in the single acting actuator, wherein the spring forces the hydraulic fluid from the single acting actuator during the transferring step.

46. The method of claim 45 wherein the single acting actuator further includes:

a spring pressuring the hydraulic fluid in the single acting actuator, wherein the spring forces the hydraulic fluid from the single acting actuator during the transferring step.

47. The method of claim 45 wherein the single acting actuator is one of a plurality of single acting actuators, the switching block in the first state allows hydraulic fluid flow between the first diverter conduit and all of the plurality of single acting actuators, and the switching block in the second state allows hydraulic fluid flow between the second diverter conduit and all of the plurality of single acting actuators.

48. The method of claim 47 wherein a first of the plurality of single acting actuators is substantially separated from a second of the plurality of single acting actuators.

49. The method of claim 48 wherein the first and second of the plurality of single acting actuators are respectively mounted on a first and second loader arm of a front end loader, wherein the first and second of the plurality of single acting actuators are separated by a distance of about the width of the front end loader.

50. The method of claim 44 further comprising the step of pressurizing the second side of the primary actuator with hydraulic fluid transmitted via the second conduit, and operating the switching block in the second state to divert the hydraulic fluid from the second conduit to the single acting actuator via the second diverter conduit, wherein the diverted fluid re-extends the single acting actuator.

51. The method of claim 44 wherein the single acting actuator is one of a plurality of single acting actuators, the switching block in the first state allows hydraulic fluid flow between the first diverter conduit and all of the plurality of single acting actuators, and the switching block in the second state allows hydraulic fluid flow between the second diverter conduit and all of the plurality of single acting actuators.

52. The method of claim 51 wherein a first of the plurality of single acting actuators is substantially separated from a second of the plurality of single acting actuators.

53. The method of claim 52 wherein the first and second of the plurality of single acting actuators are respectively mounted on a first and second loader arm of a front end loader, wherein the first and second of the plurality of single acting actuators are separated by a distance of about the width of a front end loader.

54. The method of claim 44 wherein elevating the loader arm raises the entire single acting actuator.

* * * * *